United States Patent [19]

Maiwald et al.

[11] Patent Number: 5,706,911
[45] Date of Patent: Jan. 13, 1998

[54] ELECTROMECHANICAL ACCELERATION SENSOR

[75] Inventors: Helmut Maiwald, Alfdorf; Klaus Böhmler, Schwäbisch Gmünd, both of Germany

[73] Assignee: TRW Repa GmbH, Alfdorf, Germany

[21] Appl. No.: 637,205

[22] Filed: Apr. 24, 1996

Related U.S. Application Data

[62] Division of Ser. No. 323,342, Oct. 14, 1994, Pat. No. 5,533,588.

Foreign Application Priority Data

Oct. 15, 1993 [DE] Germany ............... P43 35 250 .2
Nov. 19, 1993 [EP] European Pat. Off. ........ 93118650.6

[51] Int. Cl.$^6$ ............... H01H 35/14; B60R 21/32
[52] U.S. Cl. ............... 180/282; 200/61.53; 280/735
[58] Field of Search ............... 180/282, 274; 280/735, 734; 200/61.53, 61.45 R

[56] References Cited

U.S. PATENT DOCUMENTS

| | | | |
|---|---|---|---|
| 1,189,403 | 7/1916 | Struble et al. | 102/274 |
| 1,845,848 | 2/1932 | Richards | 200/61.53 |
| 2,902,105 | 9/1959 | Wiley et al. | 180/274 |
| 3,372,777 | 3/1968 | Filippi et al. | 280/806 |
| 3,601,081 | 8/1971 | Smith et al. | 280/734 |
| 3,974,350 | 8/1976 | Breed | 102/274 |
| 4,093,836 | 6/1978 | Ewy et al. | 200/61.53 |
| 4,161,228 | 7/1979 | Svensson et al. | 180/282 |
| 5,012,050 | 4/1991 | Sewell | 200/61.53 |
| 5,163,709 | 11/1992 | Mori | 280/806 |
| 5,217,252 | 6/1993 | Kawaguchi et al. | 280/735 |
| 5,335,941 | 8/1994 | Fohl | 280/735 |

FOREIGN PATENT DOCUMENTS

| | | | |
|---|---|---|---|
| 0466021 | 1/1992 | European Pat. Off. | |
| 0586016 | 3/1925 | France | 102/252 |
| 24 35 112 | 2/1976 | Germany | 280/735 |
| 3-100554 | 10/1991 | Japan | |
| 3-114464 | 11/1991 | Japan | |
| 2236621 | 4/1991 | United Kingdom | |
| 2244378 | 11/1991 | United Kingdom | 280/735 |

*Primary Examiner*—Brian L. Johnson
*Assistant Examiner*—Peter C. English
*Attorney, Agent, or Firm*—Tarolli, Sundheim, Covell, Tummino & Szabo

[57] ABSTRACT

An inertial sensor for activating a vehicular passenger restraining system comprises a housing and a sensor body supported in the housing for a sliding translational movement under the action of inertial forces from a rest position to an activating position. A return spring bearing with one end at the sensor body and with the other end at the housing preloads the sensor body towards the rest position. A first one of a pair of electrical contacts is stationary and fixed in the housing. A second one of the pair of electrical contacts is a strip-shaped contact spring closely spaced from the stationary contact and mounted in the housing to be deflectable by the sensor body into contact with the stationary contact.

3 Claims, 2 Drawing Sheets

1

ELECTROMECHANICAL ACCELERATION SENSOR

This is a divisional of application Ser. No. 08/323,342 filed on Oct. 14, 1994; U.S. Pat. No. 5,533,588.

BACKGROUND OF THE INVENTION

1. Field of the Invention

The invention relates to an inertial sensor for activating a vehicular passenger restraining system, having a sensor body which is slidably guided translationally in a housing and preloaded in a rest position by use of a return spring, the inertia of the sensor body acting against the force of the return spring in moving towards an actuating position.

2. Description of the Related Art

To activate vehicular passenger restraining systems—for example belt tensioners or inflatable air bags—electronic, electromechanical and mechanical inertial sensors are known. Electronic sensors are equipped with complex processing circuits which process the signal of an acceleration sensor and furnish an electric activating pulse when the time-integrated acceleration signal exceeds a predetermined threshold value. Such an electronic inertial sensor excels by the high repeatability of the activation and a high degree of reliability from being malactivated by shocks resulting in the vehicle. However, it can only be achieved at high technical expense.

To achieve reliability in preventing malactivation of mechanical and electromechanical inertial sensors also, the sensor body used must execute a certain actuating stroke up, to activation in overcoming the action of a return spring by means of which the integrating response of an electronic processing circuit can be simulated. To ensure good repeatability of the activation response this actuating stroke must amount to at least a few millimeters. The sensor body is loaded by the return spring under such a preload in its rest position that it first starts to move at acceleration values which are hardly less than the mean acceleration value at which activation is required, should the acceleration persist. For a belt tensioner or air bag system these mean acceleration values amount to approx. 12 g. Since, however, the time span up to activation is directly proportional to the travel of the sensor body (according to the known law: S=½b·t2) and a relatively large travel is required to achieve adequate repeatability, a fast response cannot be achieved with conventional electromechanical acceleration sensors.

SUMMARY OF THE INVENTION

The invention provides an inertial sensor excelling by its appreciably faster response, comparable to that of electronic sensors. According to the invention, immediately prior to the attainment of its actuating position, the sensor body is subjected to the force of an additional spring in the direction of its rest position. By far the major portion of the actuating stroke of the sensor body is directed against the force of the return spring alone. The sensor body thus responds already to low accelerations, preferably as of approx. 2 g and attains with persisting acceleration the commencement of the actuating stroke at a velocity which can be calculated from the product of the effective acceleration and the time required for the travel produced. The force of the, additional spring, which is preferably many times that of the return spring, then also counteracts the further movement of the sensor body. The combined force of both springs is then overcome when the sensor body exhibits an adequate impulse and/or a sufficiently high inertial force occurs as a result of acceleration persisting. If this condition is not satisfied, no actuation results and the sensor body is returned to its rest position when the acceleration lessens.

In the inertial sensor according to the invention the travel of the sensor body from its rest position to the activating position can be dimensioned sufficiently large so that malactivations due to shock are avoided. Since, however, the sensor body is already moved out of its rest position in the direction of the activation position at relatively low acceleration values, the time span between the occurrence of high accelerations values resulting in activation and the achievement of the activating position is appreciably shorter than for conventional inertial sensors.

In accordance with a first embodiment of the invention, the sensor body activates an electrical contact pair. In accordance with a second embodiment, the sensor body releases a spring-loaded striking pin of an impact igniter.

BRIEF DESCRIPTION OF THE DRAWINGS

Further features and advantages of the invention will now be evident from the description of three embodiments of the invention with reference to the drawing in which.

DESCRIPTION OF THE PREFERRED EMBODIMENTS

Figure 1:
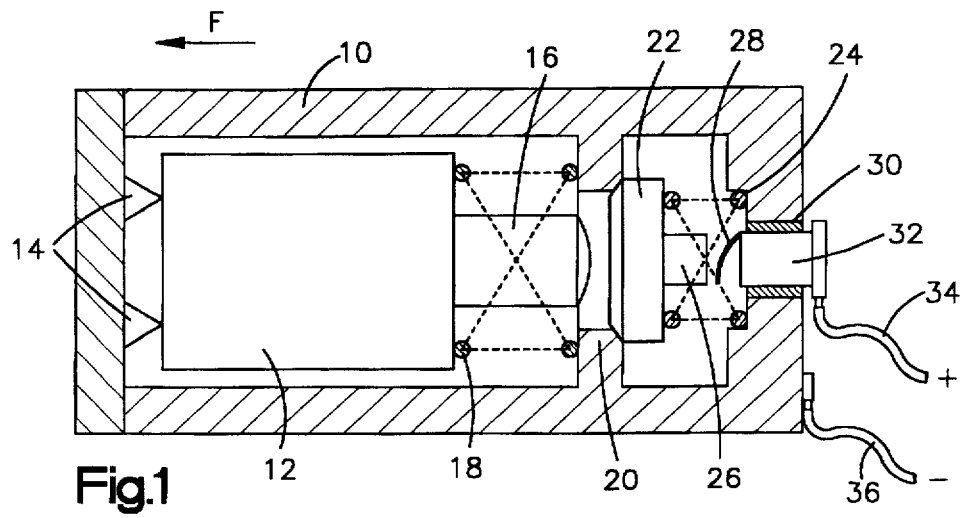
FIG. 1 is a schematic longitudinal section of a first embodiment of the acceleration sensor.

In a parallelepipedic housing 10 an also parallelepipedic or cylindrical sensor body 12 is arranged translationally shiftable. At its end facing one end of the housing 10 the sensor body 12 is supported by stops 14 of the housing. At the opposite end of the sensor body 10 an actuating pin 16 is provided. At this end a return spring 18 is also supported which at the opposite end is supported by an annular supporting wall 20 protruding into the inside of the housing 10. The return coil spring 18 acting as a compression spring subjects the sensor body to a predetermined preload in its resting position in contact with the stops 14. At its side facing away from the sensor body 12 the supporting wall 20 forms a stop for a generally disk-shaped transfer body 22 which is forced against the supporting wall by a compression spring 24. This additional compression spring 24 is also formed as a coil spring and is supported between the transfer body 22 and the internal surface of the housing 10 opposite the transfer body. This transfer body 22 carries a contact pin 26 which in the rest position shown in FIG. 1 is located opposite the free end of a spring contact 28 at a distance of roughly 0.5 mm away. The spring contact 28 is with the intermediate addition of an insulation 30 inserted through a borehole in the wall of the housing 10 and secured by a pin 32 to which a connecting wire 34 is also secured. A further connecting wire 36 is secured to the housing 10 which consists of a material having good electrical conductivity.

Figure 2A:
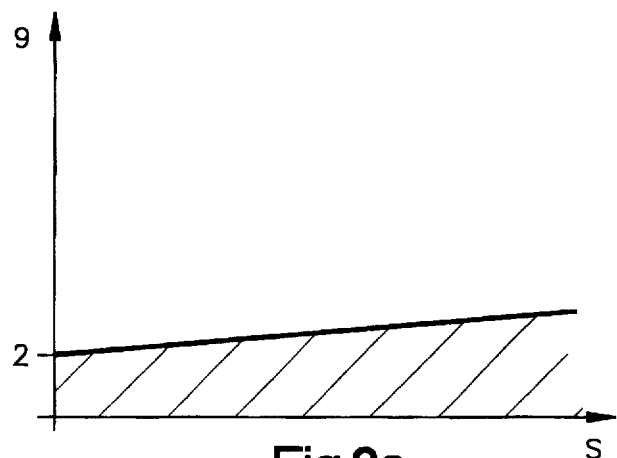
FIGS. 2a, 2b and 2c are three graphs in which the effective spring forces are plotted as a function of the travel of the sensor body.

The return spring 18 is dimensioned and preloaded such that the sensor body 12 continues to move under the effect of an acceleration of the housing 10 in the direction identified by an arrow F in FIG. 1 from the stops 14 against the force of the return spring 18 as soon as the acceleration exceeds a value of approx. 2 g. With persisting acceleration the sensor body 12 completes an initial stroke until the free end of the actuating pin 16 comes up against the transfer body 22. The magnitude of this initial stroke amounts to roughly 2 mm, but may be in the range of 1 to 3 mm depending on the version involved. The stops 14 may also be configured variable, thus making an adjustment possible. During this initial stroke the relationship between the resulting acceleration and travel materializes as plotted in the graph shown in FIG. 2a. During the translational displacement of the sensor body 12 up to abutment of the free end of the actuating pin 16 at the transfer body 22 only the return spring 18 is effective.

Figure 2B:
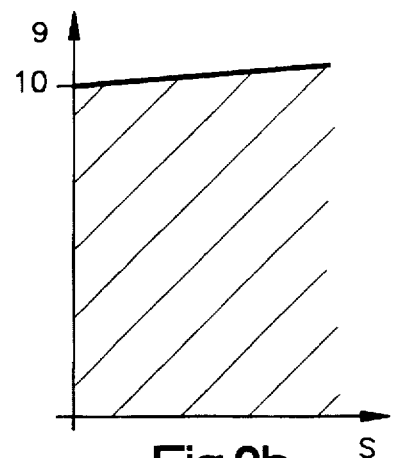
Figure 2C:
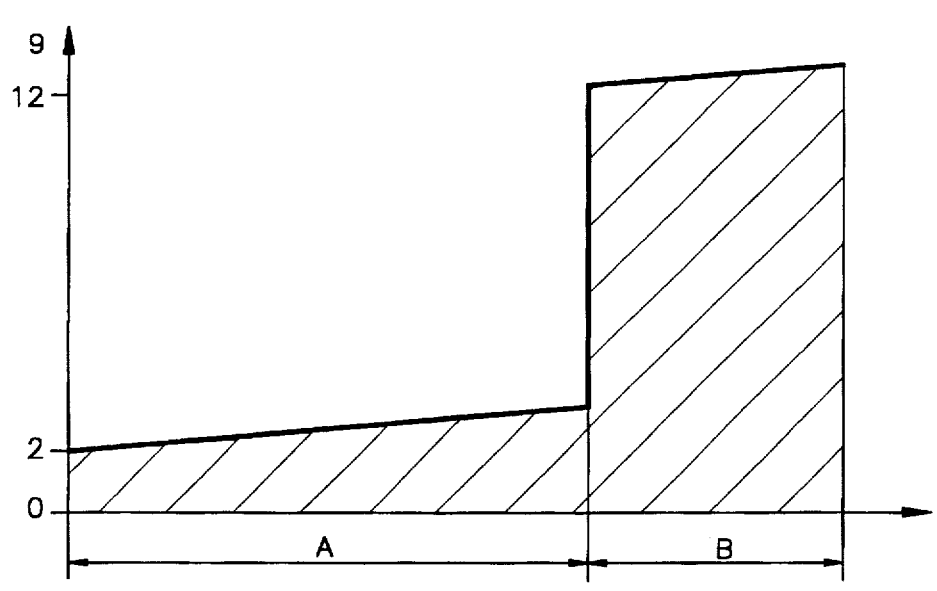

The graph in FIG. 2b shows the relationship between the resulting acceleration and travel when the additional compression spring 24 alone is effective. The compression spring 24 is subjected to roughly five times the preloading of the return spring 18 so that a displacement does not occur until an acceleration of more than 10 g exists. In actual fact, however, when the sensor body 12 is moved past the point of contact with the transfer body 22 both springs are effective since the return spring 18 and the compression spring 24 are then functionally connected in parallel. The effect of the return spring 18 in combination with the additional compression spring 24 is illustrated in the graph of FIG. 2c. Past the initial stroke identified by A only the return spring 18 is effective; in the subsequent actuating stroke B both springs are effective. Thus displacement of the transfer body 22 does not occur until an acceleration of 12 g is exceeded. If the high acceleration persists, the front end of the contact pin 26 then comes up against the free end of the contact spring 28 at the end of the actuating stroke B, causing an activation signal to be produced for an electric igniter on a pyrotechnical gas generator and the like. If the acceleration fails to persist or becomes less the transfer body 22 does not attain this activation position, but instead reverts to its original position at the supporting wall 20. With a further reduction in the acceleration the sensor weight 12 also returns to its rest position.

The housing 10 of the acceleration sensor is secured to the body of the vehicle. If the vehicle collides with an obstacle greatly fluctuating decelerations and accelerations result in the longitudinal direction of the acceleration sensor. The spring-loaded sensor weight 12 behaves as an integrating member so that the activation action can be principally illustrated as shown in the graph of FIG. 2c.

The criterion for activation of the acceleration sensor according to the invention is not a certain mean acceleration value being exceeded, but the velocity of the sensor body at the start of the actuating stroke B. If this velocity is high enough, contacting occurs. Otherwise the sensor body 12 returns to its rest position when there is a reduction in the acceleration.

Figure 3:
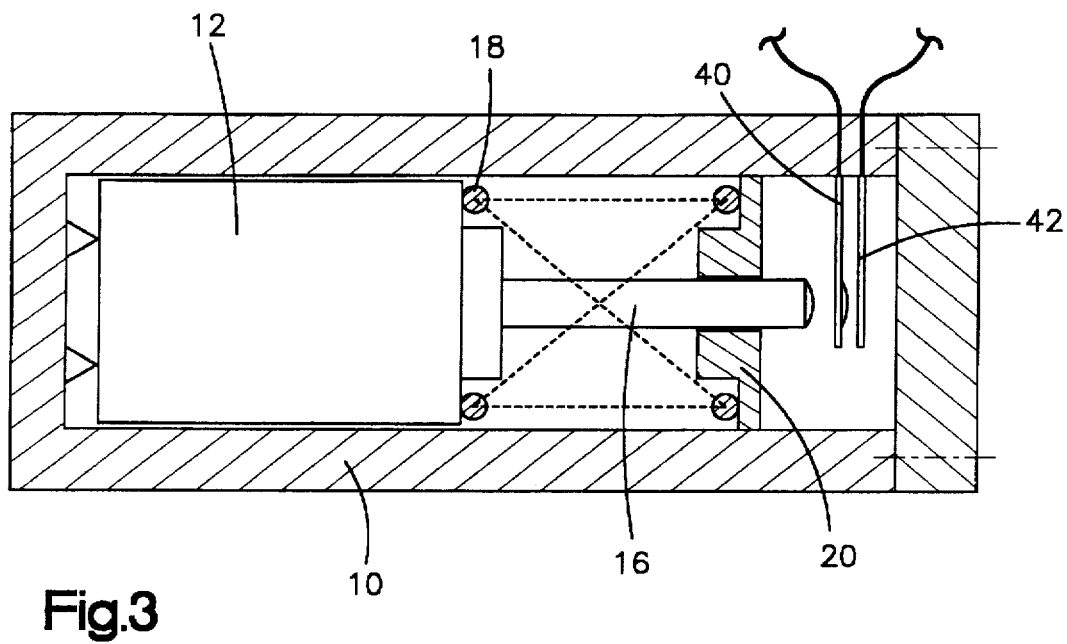
FIG. 3 is a schematic longitudinal section of a second embodiment of the acceleration sensor.

The embodiment shown in FIG. 3 differs from that shown in FIG. 1 in that the transfer body is eliminated and the additional spring takes the form of a spring contact 40 tensioned on the housing 10 into the interior space of which it protrudes. The contact spring 40 constitutes the moving contact of a pair of contacts, the fixed contact 42 of which is also tensioned at the housing 10 into the interior space of which it protrudes. The spacing between these contacts amounts to approx. 0.5 mm and may be in the range of approx. 0.3 to 0.8 mm. The free end of the actuating pin 16 of the sensor weight 12 is spaced roughly 2 mm away from the opposite surface of the contact spring 40 when the sensor weight is in its rest position. As compared to that of the return spring 18 the spring hardness of the contact spring 40 is higher, thus resulting for this version too, in the dependency of the acceleration and the resulting travel as illustrated in FIG. 2c. The actuating stroke B begins as soon as the free end of the actuating pin 16 comes up against the contact spring 40 and is completed as soon as the contact spring 40 contacts the fixed contact 42. Preferably, the entire stroke of the sensor body 12 from the rest position to the activating position is in the range of 2 to 4 millimeters.

Contact bounce is prevented in both embodiments by the pliancy of the contact spring.

Figure 4:
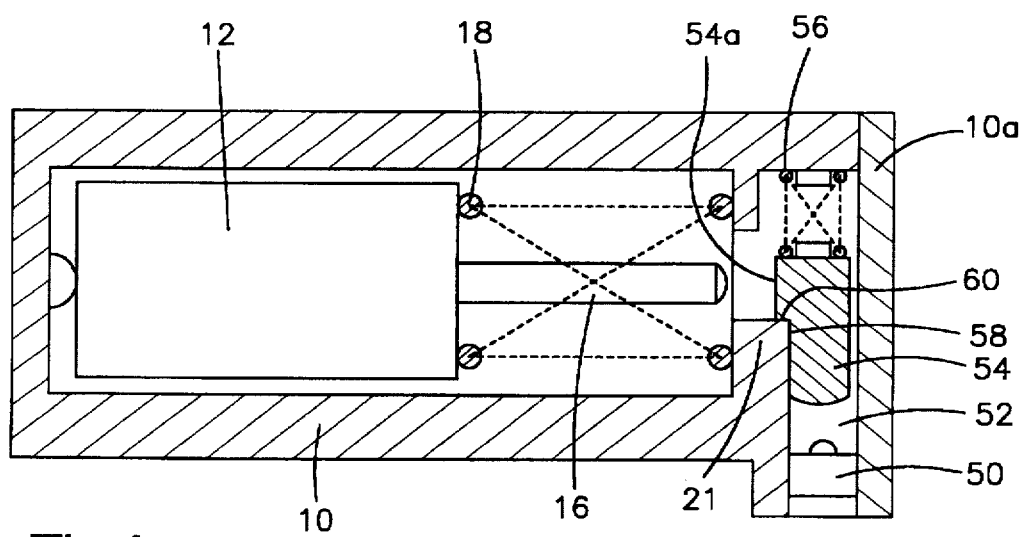
FIG. 4 is a schematic longitudinal section of a third embodiment of the acceleration sensor.

In the embodiment shown in FIG. 4, the order and the construction of the sensor mass 12 and its actuating pin 16 correspond largely with those in the embodiment according to FIG. 3, so that no new description follows. This embodiment is meant for the actuation of a pyrotechnic gas generator with an impact igniter however. The impact igniter 50, which is only schematically represented in FIG. 4, is located at the end of a boring 52 of the housing 10, which is arranged perpendicular to the axis of the sensor body 12. The boring 52 lies between the end wall 10a of the housing 10 facing away from the sensor body 12 and a partition 21 of the housing, which is open to the free end of the actuating pin 16. A striking pin 54 is received in the boring 52 with clearance to the inner side of the end wall 10a. A tensioned pressure spring 56 is supported between the floor wall of the boring 52 and the end face of the striking pin 54 lying opposite. The free end of the striking pin lying opposite is held at a distance of for example about 10 mm from the impact igniter. Furthermore, the striking pin 54 is provided with a side piece 54a on which a ramp face is formed, which lies opposite the free end of the actuating pin 16. With this ramp face 58, the striking pin 54 is supported in the safety position shown in FIG. 4 on a corresponding support face 60 on the inner edge of the partition 21. The ramp face 58 and the support face 60 are inclined at such an angle to the axis of the sensor body 12, that the striking pin 54 is held in contact with the neighbouring face of the partition 21 through the axial force component effected by the pressure spring 56 acting in the direction of the sensor body 12. The axial extension of the ramp face 58 is somewhat smaller than the distance between the striking pin 54 and the inner side of the end wall 10a, so that the striking pin 54 is released from the support face 60 when it is shifted beyond the edge of the support face 60 in the direction of the end wall 10a and then accelerated by the pressure spring 56 in the direction of the impact igniter 50.

When the sensor body 12 is shifted towards the striking pin under the effect of its inertia due a deceleration of the vehicle, only the return spring 18 acts on the sensor body until the sensor body engages the striking pin 54. As soon as the free end of the actuating pin 16 connects with the side piece 54a of the striking pin 54, the axial force component created by the pressure spring 56 under the effect of the ramp face 58 supported on the support face 60 must also be overcome in addition to the force of the spring 18 in order to further move the sensor body 12. The pressure spring 56 is stiffly dimensioned in comparison to the return spring 18, so that the sum of the effective forces corresponds to the graph in FIG. 2c. In this embodiment too, no actuation results if the impulse of the sensor body 12 does not have a sufficiently large value. The striking pin 54 then returns to its safety position in contact with the side face of the partition 21.

In this embodiment, several parameters are available for influencing the actuation characteristic, in particular, the dimensioning of the return spring 18, the stiffness of the pressure spring 56 and the axial range of the ramp face 58.

By means of the acceleration sensor according to the invention surprisingly fast activation, comparable to that of electronic activation systems, is achieved as compared to conventional designs. Since the sensor weight responds only to accelerations in one direction, i.e. the longitudinal direction of the housing 10, there is no sensitiveness to transverse accelerations whatsoever.

What is claimed is:

1. An inertial sensor for activating a vehicular passenger restraining system, comprising a housing, a sensor body supported in said housing for a sliding translational movement under the action of inertial forces from a rest position to an activating position, a return spring bearing with one end at said sensor body and with the other end at said housing and preloading said sensor body towards said rest position and a pair of electrical contacts a first one of which is a stationary contact fixed in the housing and a second one of which is a strip-shaped contact spring closeby spaced from said stationary contact and mounted in said housing to be deflectable by said sensor body into contact with said stationary contact, said return spring being dimensioned to be overcome by inertial forces acting on said sensor body under an acceleration of approximately 2 g, and said contact spring being dimensioned to be deflected by inertial forces acting on said sensor body under an acceleration of approximately 12 g.

2. The sensor of claim 1, wherein said sensor body has a stroke in the range from 2 to 4 millimeters between said rest and activating positions.

3. The sensor of claim 1, wherein said electrical contacts have a spacing between 0.3 and 0.8 millimeters.

* * * * *